P. MacGAHAN.
ELECTRICAL MEASURING INSTRUMENT.
APPLICATION FILED JULY 17, 1912.
1,116,455.
Patented Nov. 10, 1914.
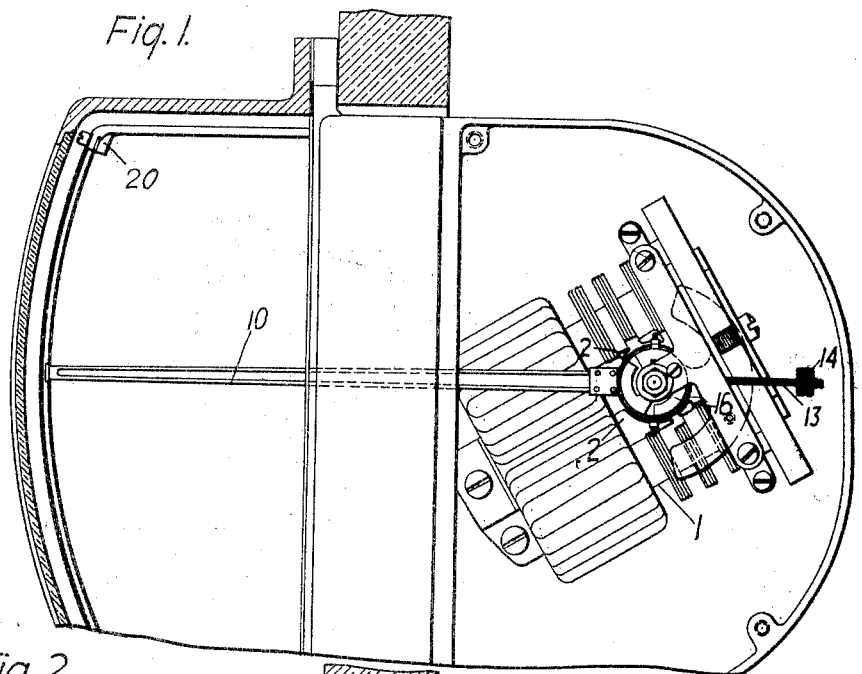
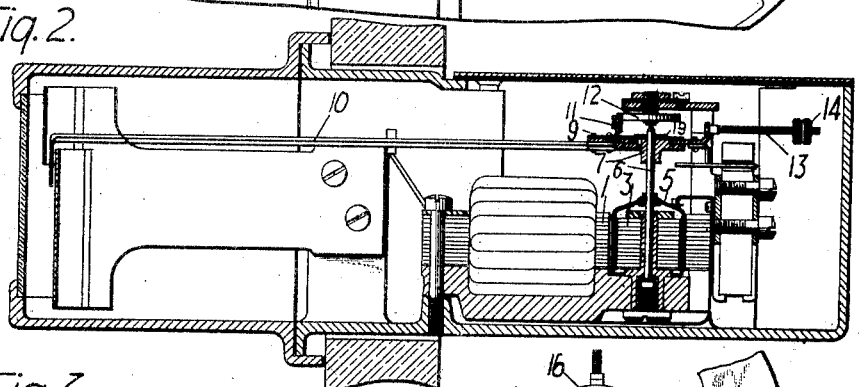
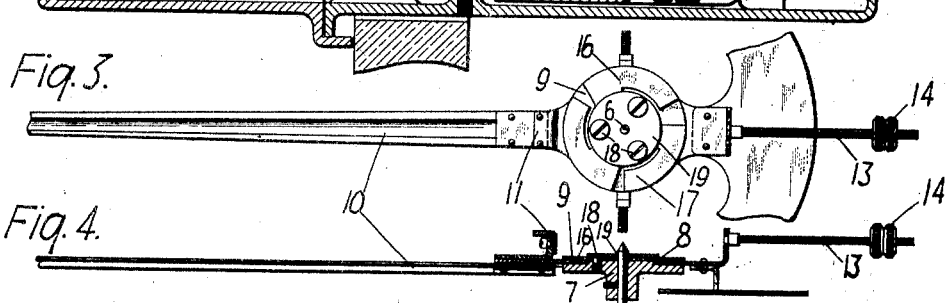
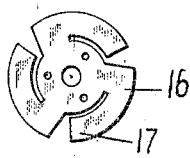
WITNESSES:
INVENTOR
Paul MacGahan
BY
Wiley J. Carr
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,116,455.

Specification of Letters Patent.

Patented Nov. 10, 1914.

Application filed July 17, 1912. Serial No. 710,035.

*To all whom it may concern:*

Be it known that I, PAUL MacGAHAN, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring and similar instruments, and particularly to the mountings of the pointers thereof.

The object of my invention is to provide means for attaching the pointer of an electrical measuring or other instrument to the movable element thereof which will permit of relative movement between the pointer and the movable element when the pointer is moved suddenly against its limiting stops, the pointer and other parts being thereby protected from injury when unduly large amounts of current traverse the instrument.

My invention is illustrated in the accompanying drawing, Figure 1 of which is a side and sectional view of an electrical measuring instrument embodying the same. Fig. 2 is an end and sectional view of the instrument of Fig. 1. Fig. 3 is an enlarged plan view of the pointer and its mounting. Fig. 4 is an enlarged sectional view of the pointer and its mounting, and Fig. 5 is a plan view of a spring washer that is employed as a part of the mounting.

The present invention may be applied to any suitable type of electrical measuring or other instrument, but is here shown as applied to a meter comprising a substantially U-shaped stationary magnetizable core member 1 having laterally extending curved opposing poles 2 and a cylindrical core member 3 supported between the said poles so as to provide an annular field space for the reception of a cylindrical conducting drum 5, the said instrument being similar in construction to that set forth in Patent No. 794,395. The drum 5 constitutes the movable element of the instrument and is suitably mounted upon a shaft 6, upon one end of which a plate or flange 7 is rigidly secured. The outer face of the plate 7 is provided with a central boss 8 which leaves an annular seat near the edge of the plate for the reception of a ring-shaped hub portion 9 of a pointer 10, the said pointer being provided with a clamp 11 for one end of a spiral spring 12 which opposes movement of the movable element of the instrument. The pointer is also provided with a threaded extension 13 which carries a nut 14 for balancing the pointer. The hub 9 of the pointer is retained against its seat by means of a washer 16 having short annular resilient lips 17 that are bent downwardly to bear against the hub, the said washer 16 being secured to the plate 7 by means of screws 18 and a superposed rigid washer 19. A stop 20 is provided to limit the movement of the pointer 10.

It will be observed from the drawings and from the above explanation thereof that the pointer 10 has only frictional engagement with the movable member of the instrument, and that, consequently, it may be moved relatively thereto when sufficient force is applied between the said parts. The pressure of the resilient portions of the washer 16 is so regulated that such relative movement will occur when the pointer is moved suddenly against the stops defining its limits of travel. Consequently, when the instrument is traversed by unduly high currents, there is no danger of bending the pointer or of otherwise injuring the instrument. The relative movement between the pointer and the movable element is permissible because the said movable element is in the form of a cylindrical drum which moves in a cylindrical field, and the electrical conditions are consequently not varied by such relative movements. The instrument, therefore, remains accurate under all conditions.

I claim as my invention:

1. A measuring instrument comprising a movable member, a pointer carried thereby that is retained in frictional engagement therewith and is movable relatively thereto, and a stop for limiting the movement of the pointer.

2. A measuring instrument comprising a movable member provided with a seat, a pointer mounted upon the said seat and movable relatively thereto, resilient means for retaining the pointer against the seat, and a stop for limiting the movement of the pointer.

3. A measuring instrument comprising a movable member, a pointer carried thereby and movable relatively thereto, resilient means tending to restrain such relative movement, and a stop for limiting the movement of the pointer.

In testimony whereof, I have hereunto subscribed my name this 3rd day of July 1912.

PAUL MacGAHAN.

Witnesses:
 CLAYTON DILL,
 B. B. HINES.